(12) United States Patent  (10) Patent No.: US 7,111,412 B2
Huang  (45) Date of Patent: Sep. 26, 2006

(54) WHEEL VEHICLE MEASURING APPARATUS

(75) Inventor: Jason Huang, Taipei (TW)

(73) Assignee: Index Measuring Tape Co., Ltd., Taipei (TW)

( * ) Notice: Subject to any disclaimer, the term of this patent is extended or adjusted under 35 U.S.C. 154(b) by 0 days.

(21) Appl. No.: 11/037,234

(22) Filed: Jan. 19, 2005

(65) Prior Publication Data

US 2006/0156573 A1  Jul. 20, 2006

(51) Int. Cl.
*G01B 3/12* (2006.01)
(52) U.S. Cl. .......................... 33/772; 33/779
(58) Field of Classification Search ............ 33/345, 33/772–782, DIG. 1
See application file for complete search history.

(56) References Cited

U.S. PATENT DOCUMENTS

| 1,835,804 | A | * | 12/1931 | Morra | 33/781 |
| 2,110,757 | A | * | 3/1938 | Clarke | 33/773 |
| 2,129,979 | A | * | 9/1938 | Westervelt et al. | 33/782 |
| 2,662,292 | A | * | 12/1953 | Pickard | 33/781 |
| 2,716,819 | A | * | 9/1955 | Staples | 33/781 |
| 2,741,031 | A | * | 4/1956 | Martin, Jr. et al. | 33/781 |
| 2,817,906 | A | * | 12/1957 | Hall | 33/772 |
| 2,933,821 | A | * | 4/1960 | D'Enis | 33/345 |
| 3,616,541 | A | * | 11/1971 | Crayton | 33/781 |
| 4,308,665 | A | * | 1/1982 | Losch | 33/781 |
| 4,667,413 | A | * | 5/1987 | Pitts | 33/345 |
| 5,067,249 | A | * | 11/1991 | Terrigno | 33/773 |
| 2004/0016141 | A1 | * | 1/2004 | Hofstee | 33/772 |

* cited by examiner

*Primary Examiner*—G. Bradley Bennett
(74) *Attorney, Agent, or Firm*—Lowe Hauptman & Berner

(57) ABSTRACT

Disclosed is a vehicle wheel measuring apparatus, comprising a push rod, a counter, a wheel, and a gear coupled mechanism, wherein the counter is disposed on top of the push rod. Through the gear coupled mechanism, the axle center of said counter and the wheel axle form a joint relationship having the same rotational cycles. A front yoke is attached to the wheel axle in the end of said push rod, and a set of magnetic element is disposed between the wheel axle and the interior side of the front yoke. This prevents the wheel from rotating by itself that affects actual measured distance.

6 Claims, 5 Drawing Sheets

WHEEL VEHICLE MEASURING APPARATUS

BACKGROUND OF THE INVENTION

1. Field of the Invention

The present invention relates to a wheel vehicle measuring apparatus and more particularly to a measuring apparatus in which the wheel and counter has the same rotation cycle and forms joint relationship through the gear coupled mechanism, and a set of magnetic element is disposed on one side of the wheel to prevent the wheel from rotating by itself that may affect actual measured distance.

2. Description of the Prior Art

Accordingly, a conventional measuring wheel vehicle as shown in FIG. 1, primarily comprises a rack 11, a counter 12 disposed on the rack 11, a reset button 13 disposed on one side of the counter 12, and a roller 14 disposed on another side of counter 12 having proper distance with each other. The axle center of counter 12 and the axle of roller 14 form as a unity, thus the counter 12 can show rolling distances of the roller 14 in digits. Also, a sleeve is disposed on the outer covering of counter 12, allowing a push rod 16 with proper length to be inserted therein in order for users to handle and push the roller 14 easily and conveniently.

As handle push rod 16 pushes the roller 14, the mileometer on the top of counter 12 displays the distance the roller 14 has rolled on the ground, by which ground measuring purposes can be achieved. When re-measuring the distance, users only need to press the reset button on one side of the counter 12 to restore its setting.

However, conventional measuring wheel apparatus appear to have the following deficiencies:

1. A counter shows the mileage owing to rotation of the wheel. However, when the wheel moves off from ground, it may rotate arbitrarily due to surrounding air disturbance or effects of inertia. Thus, the actual measured distance may be altered.
2. Since the counter disposed on one side of the roller is far away from the top of push rod, users have to bend down or squat down in order to see the values shown on the counter or to press the reset button.

Accordingly, the present invention has been invented to solve the above-mentioned problems occurred in the prior art.

SUMMARY OF THE INVENTION

Accordingly, an object of the present invention is to provide a vehicle wheel measuring apparatus by devising a set of magnetic element on one side of the wheel to present the wheel from rotating by itself when the wheel moves away from the ground and to make measured values accurate.

The vehicle wheel measuring apparatus according to the present invention has a counter disposed on top of the push rod, so that users can see or control the reset button easily, which largely enhances the convenience of usage. This is further object of the present invention.

The detailed structure, application principle, function, and effects of the present invention will be more apparent from the following descriptions taken in conjunction with the accompanying drawings.

DETAILED DESCRIPTION OF THE EMBODIMENTS

Figure 1:
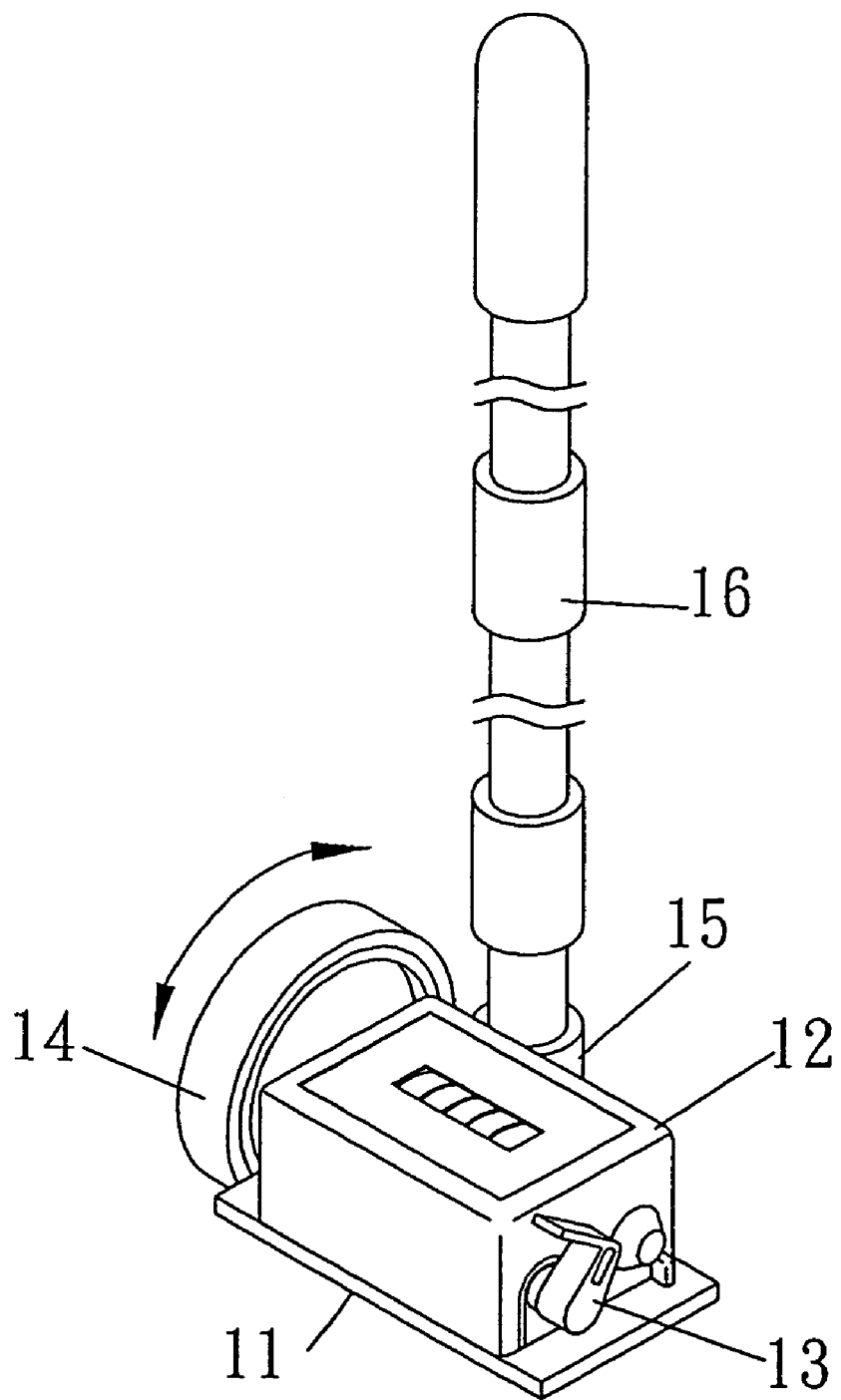
FIG. 1 is a three-dimensional view of the conventional measuring wheel vehicle.
Figure 2:
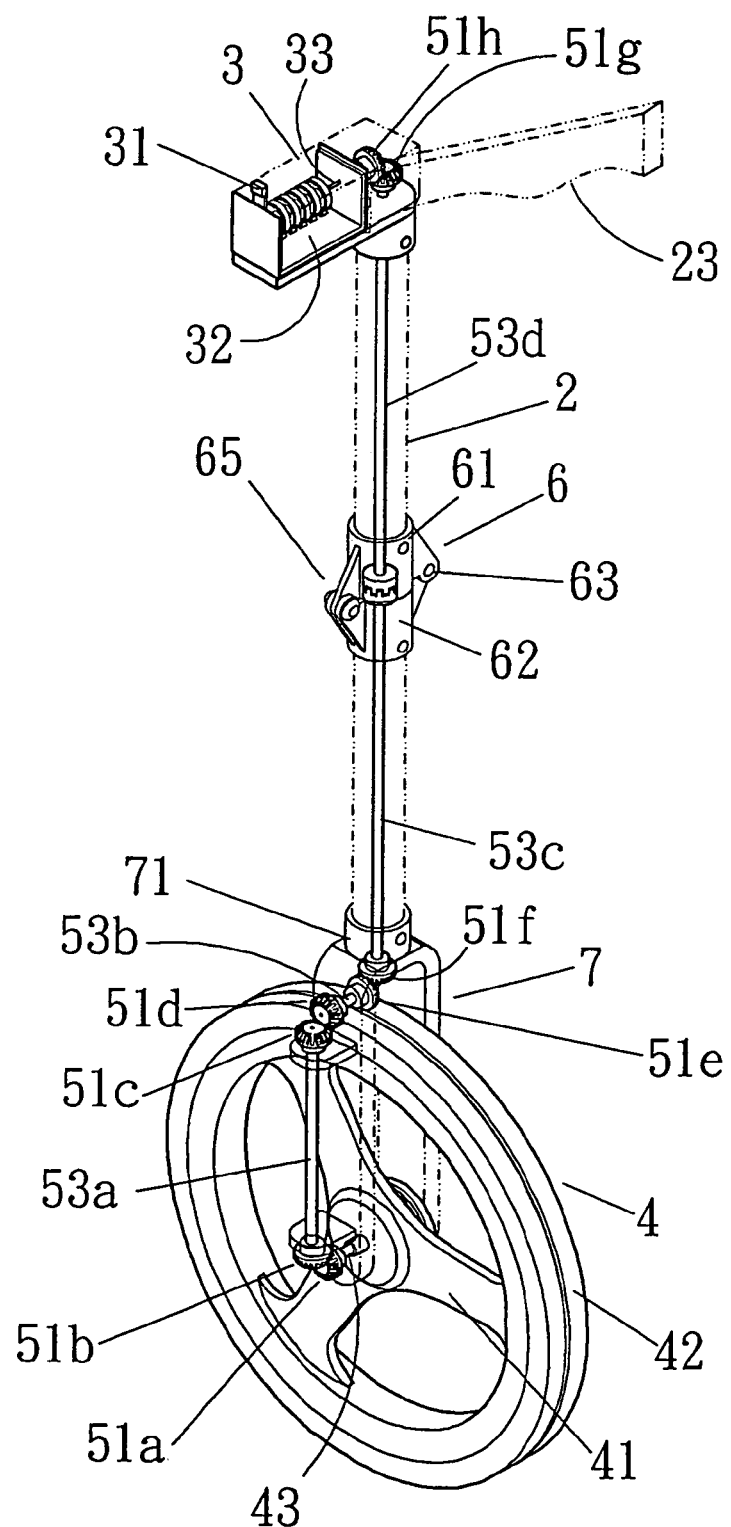
FIG. 2 is an overall three-dimensional view of the present invention.
Figure 3:
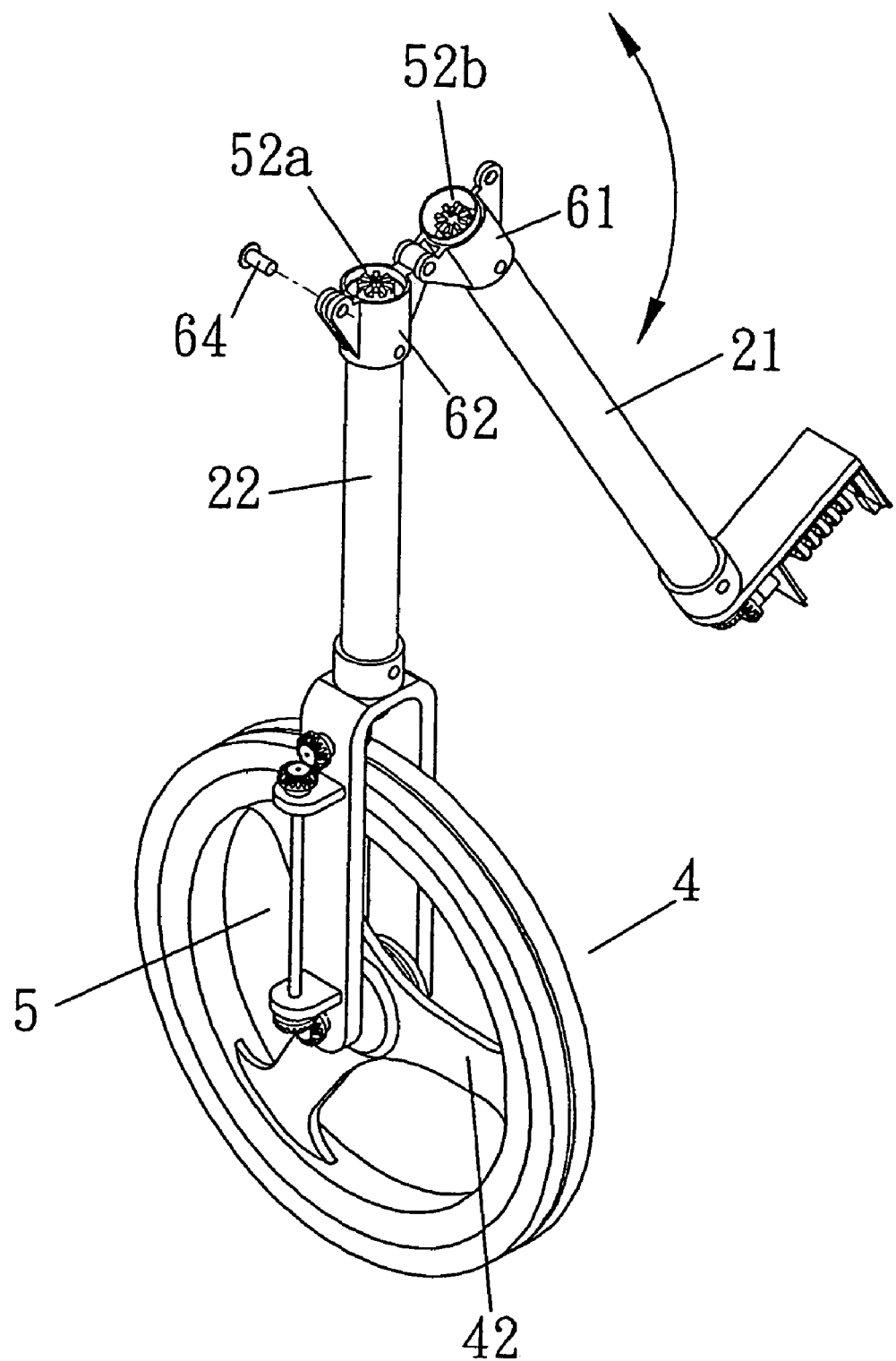
FIG. 3 is a three-dimensional view showing the folding movement of the push rod in the present invention.
Figure 4:
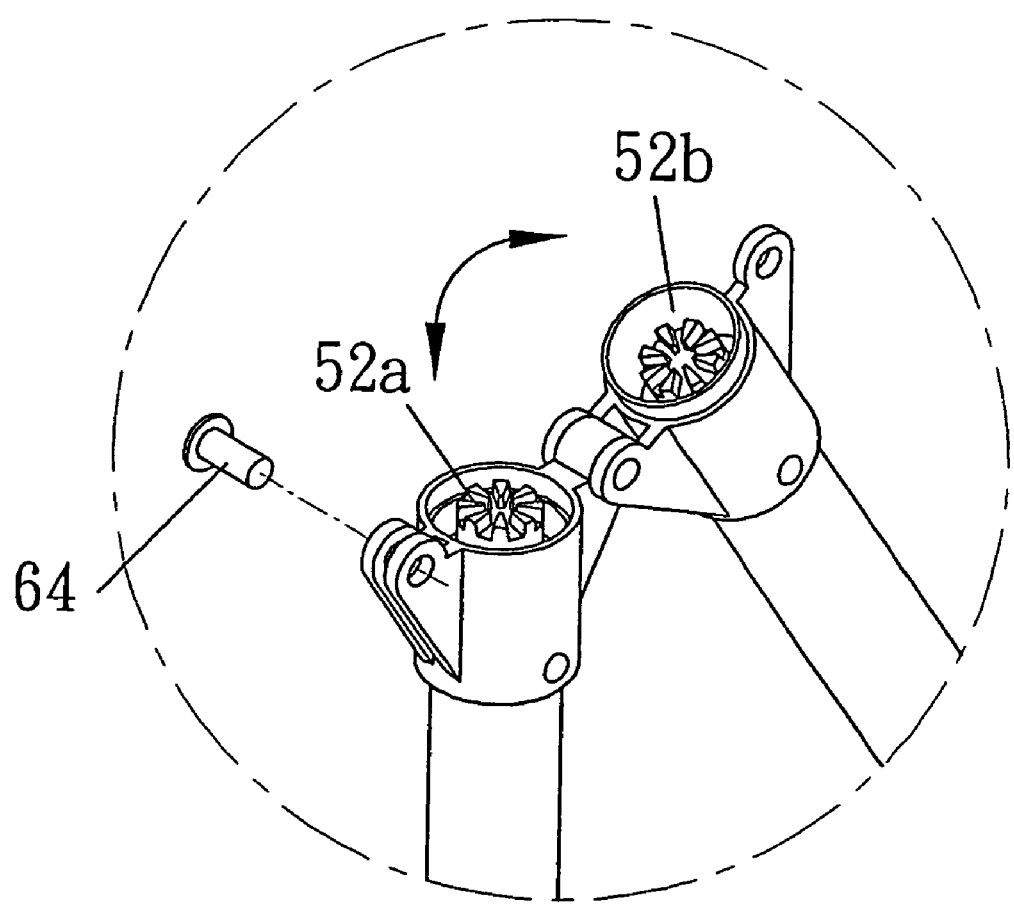
FIG. 4 is an enlarged view of the bending parts in the present invention.

Referring to FIGS. 2, 3, and 4, the wheel vehicle measuring apparatus according to the present invention comprises a push rod 2, a counter 3, a wheel 4, and a gear coupled mechanism 5; wherein the push rod 2 is a cylinder hollow rod comprising an upper rod 21 and a lower rod 22, which are connected with each other through a bending part 6 and constitute a erect cuboid rod or bendable two section rod. The bending part 6 comprises an upper tube 61 which is connected with one end of the upper rod 21, and a lower tube 62 which is connected with one end of lower rod 22. A Rivets of metal is set through one side of the upper tube 61 and lower tube 62 as pivot turn 63, and an active pivot 64 is set through another side of the upper tube 61 and lower tube 62 as opening part 65; when the active pivot 64 is pulled away from the opening part 65, upper rod 21 and lower rod 22 can be closed in accordance with folding and close of the pivot turn 63. Furthermore, there is a handle 23 for the user easy to grasp.

Counter 3 is disposed on top of the upper rod 21, and a reset button is disposed thereon; a digital mileometer 32 is arranged in the counter 3;

Wheel 4, which is made of rubber wheel rim 41 and flat tire surface 42, is disposed on the lower end of push rod 2 and connected to the push rod 2 through a U-shaped front yoke 7. The front yoke 7 is formed as a unity by plates with proper width, where two plates on its two sides are disposed on two sides of the wheel axel 43, with their upper ends provided with a socket 71 for connecting with the upper rod 22 of push rod 2;

Gear coupled mechanism 5 is composed of eight 45-degree bevel gears, two engaged gears, and four connecting rods; wherein the first bevel gear 51*a* is disposed in one end of wheel axle 43, the last bevel gear 51*h* is disposed in the end of the axle center 33 of counter 3. The first connecting rod 53*a* is erectly disposed on one side of front yoke 7 with its upper and lower end connecting; with a bevel gear 51*b* and 51*c* respectively. The second connecting rod 53*b* is transversely disposed through the lateral plate of front yoke 7 with its upper and lower end connecting with a bevel gear 51*d* and 51*e* respectively. The third connecting rod 53*c* and fourth connecting rod 53*d* is disposed inside of lower rod 22 and upper rod 21 respectively. The third connecting rod 53*c* is provided with a bevel gear 51*f* in its lower end, and a pair of engaged gears 52*a* in its upper end, while the fourth connecting rod 53*d* is provided with a pair of engaged gears 52*b* in its lower end, and a bevel gear 51*g* in its upper end. Since the bevel gears and engaged gears are designed to have the same number of gear wheels, the axle enter 33 of the counter and the wheel axle can have the same rotational cycle and form 1:1 joint relationship.

Figure 5:
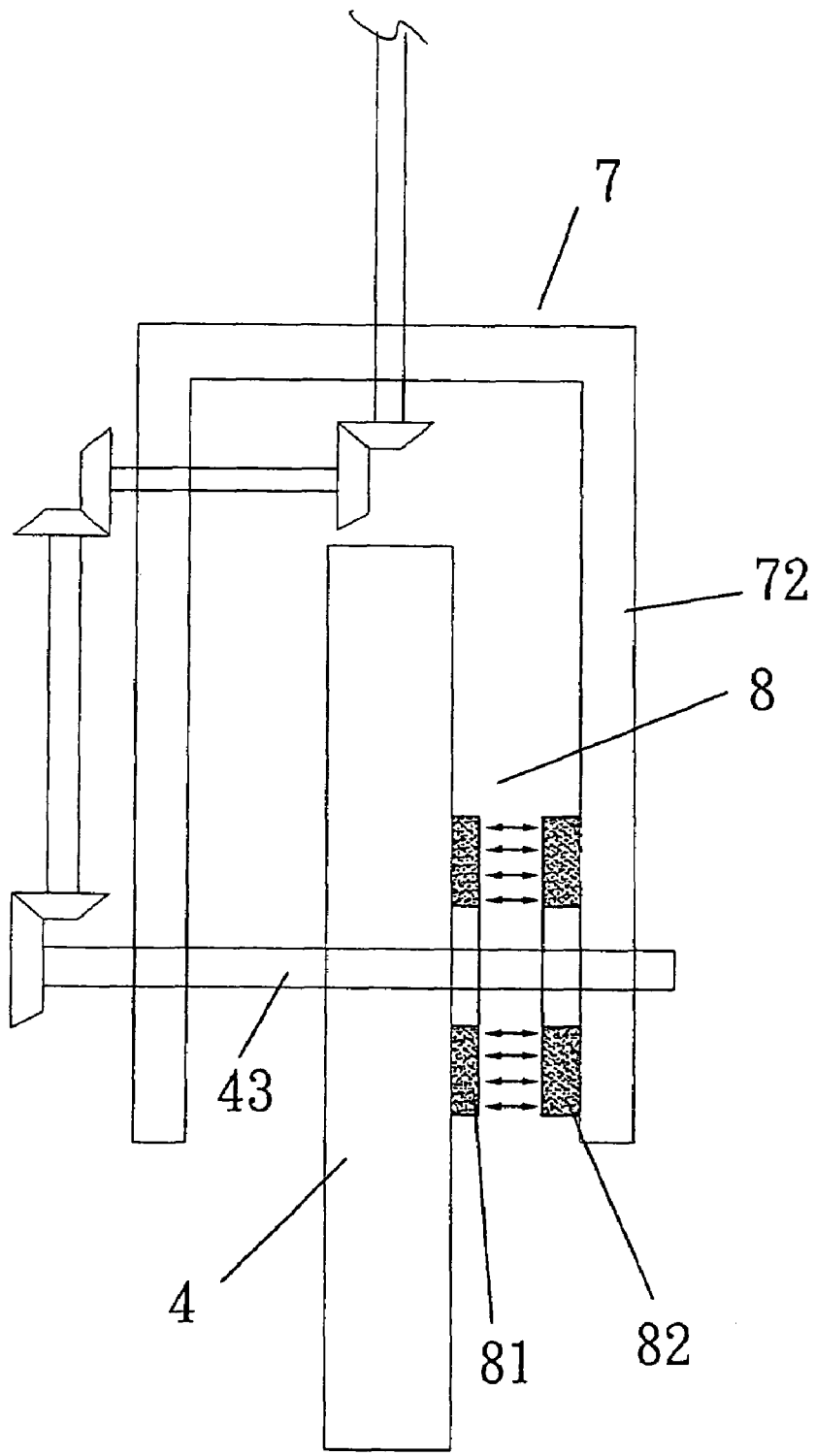
FIG. 5 is a view showing the magnetic elements in the present invention.

In addition, referring to FIG. 5, a reluctance space is disposed on one side of the wheel 4, with magnetic elements 81 and 82 are disposed in its two sides in proper distance. The magnetic element 81 and 82 are typical magnets or plastic magnets with magnetism. Also, the magnetic element 81 is fixed on the exterior surface of the wheel rim of wheel 4, while the magnetic element 82 is fixed on the interior side of the lateral plate 72 of the front yoke. This structure allows the two magnetic elements 81 and 82 to be apart at proper distance in which they can attract with each other but cannot be stuck.

The term "fixed" as mentioned above refers to the way of fastening or sticking screws. In addition, the magnetic elements 81 and 82 can be formed with the wheel rim 41 or lateral plate 72 of said front yoke as a unity; that is, they can be formed the same way as the wheel rim 41 or lateral plate 72 of said front yoke. Moreover, the magnetic elements 81 and 82 can be formed as circle or other shapes.

With provision of two magnetic elements 81 and 82, wheel 4 is attracted by the magnetism all the time. Even if the wheel 4 did not contact with ground to make measurement, the attraction caused by magnetism forms resistance to prevent the wheel 4 from revolving arbitrarily and result in the change of measured distance. During operation, wheel 4 can revolve stably owing to the attraction of magnetic elements 81 and 82. This is because the tire surface 42 of the wheel 4 is flat, and the friction caused by contacting tire surface 42 with ground is greater than the attraction of magnetic elements 81 and 82.

Therefore, in the wheel vehicle measuring apparatus according to the present invention, due to the setup of gear coupled mechanism 5, counter 3 can be placed on top of the push rod where users can see the counter and operate the reset button easily and conveniently. The magnetic element 81 and 82 are provided to make the wheel roll stably and unchangeable, so that the distance measured can remain accurate. Also, the design of the foldable push rod enables the wheel measuring apparatus to be folded without occupying any space.

As described above, the wheel vehicle measuring apparatus according to the present invention provides an easy and convenient way for using the measuring wheel by devising a set of reluctance space and two magnetic elements between the wheel and front yoke, and ensures that the measured value of distance will not be altered due to mis-rotation of the wheel. Moreover, since the wheel is attracted by proper attraction, it can revolve stably even if it contacts with ground, which prevent the situation of over-rotation due to external force. Also, the counter is disposed on top of the push rod, allowing users to control the reset button without bending down. This provides ease and convenience to those having problems in bending their backs, such as the elders or patents. Also, the present invention has not yet opened to public, it is then complied with the conditions of allowable patents.

Although the above-mentioned embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A wheel vehicle measuring apparatus, comprising:
upper and lower hollow push rods;
a counter including a digital number display disposed in one end of said upper push rod, and said counter having a center axel; and the rotation of said center axel driving the counter for display with digital numbers;
a wheel disposed at one end of said lower push rod and composed of a wheel rim and tire surface, and said wheel having a center axel; wherein the center axle of said wheel and the center axle of said counter have the same rotation cycles and forms a joint relationship; and
wherein an inverted-U shaped front yoke having upper and lower ends is disposed between said wheel and said lower push rod; two lateral plates in said lower end of said front yoke attached to said center axel of said wheel and said upper end of said front yoke is coupled with said lower hollow push rod through a socket;
a gear coupled mechanism including several bevel gears, engaged gears and connecting rods for rotating said center axel of said counter in response to rotation of said center axel of said wheel;
wherein one of said connecting rods is disposed in said lower hollow push rod with one of said engaged gears fixed to an upper end thereof and a second of said connecting rods disposed in said upper hollow push rod with a second of said engaged gears fixed to a lower end thereof;
means for bending said upper hollow push rod with respect to said lower hollow push rod between an operational position and a folded position; and
wherein said engaged gears are engaged with one another when said push rods are in an operational position and disengaged when said push rods are in a folded position.

2. The wheel vehicle measuring apparatus as claimed in claim 1, wherein a reluctance space and two magnetic elements are disposed between a lateral plate of said front yoke and one side of said wheel.

3. The wheel vehicle measuring apparatus as claimed in claim 2, wherein the bevel gears of said gear coupled mechanism have 45° angles.

4. The wheel vehicle measuring apparatus as claimed in claim 1, wherein said push rod is a cannular rod, comprising an upper rod and a lower rod which are connected through a bending part as being an erect cuboid rod or two section parallel rod.

5. The wheel vehicle measuring apparatus as claimed in claim 2, wherein an inverted-U shaped front yoke is disposed between said wheel and push rod; two lateral plates in the lower end of said front yoke are attached to the wheel axle, and the upper end of said front yoke is coupled with the push rod through a socket.

6. The wheel vehicle measuring apparatus as claimed in claim 2, wherein said reluctance space and two magnetic elements are disposed with one of said magnetic elements fixed inside of said lateral plate of said front yoke and the two magnetic elements are spaced form one another by a proper distance.

* * * * *